United States Patent [19]

Ichimura et al.

[11] Patent Number: 4,741,932
[45] Date of Patent: May 3, 1988

[54] COATING COMPOSITION AND METHOD FOR FORMING A MULTI-LAYERED COATING

[75] Inventors: Kiyoshi Ichimura, Abiko; Koichiro Kido, Nagoya; Kazuhiko Hotta, Nagoya; Shogo Yamamoto, Nagoya, all of Japan

[73] Assignee: Mitsubishi Rayon Company Limited, Tokyo, Japan

[21] Appl. No.: 68,808

[22] Filed: Jun. 30, 1987

Related U.S. Application Data

[63] Continuation of Ser. No. 833,250, Feb. 27, 1986, abandoned.

[30] Foreign Application Priority Data

Mar. 8, 1985 [JP] Japan .................................. 60-45894
Apr. 30, 1985 [JP] Japan .................................. 60-93082

[51] Int. Cl.⁴ .............................................. B05D 3/02
[52] U.S. Cl. ................... 427/407.1; 427/409; 427/410; 427/412.3; 427/412.5
[58] Field of Search .............. 427/407.1, 409, 410, 427/412.3, 412.5

[56] References Cited

U.S. PATENT DOCUMENTS

| | | | |
|---|---|---|---|
| 3,671,293 | 6/1972 | Waiie et al. | 428/463 X |
| 4,034,017 | 7/1977 | Chang et al. | 427/388.3 X |
| 4,359,504 | 11/1982 | Troy | 427/409 X |
| 4,382,114 | 5/1983 | Höhlein et al. | 427/409 X |
| 4,397,989 | 8/1983 | Adesko | 427/409 X |
| 4,413,036 | 11/1983 | Drexler et al. | 427/409 X |
| 4,463,038 | 7/1984 | Takeuchi et al. | 427/407.1 |
| 4,514,445 | 4/1985 | Hokamura et al. | 427/410 |
| 4,529,632 | 7/1985 | Fujii et al. | 427/409 |

FOREIGN PATENT DOCUMENTS

| | | |
|---|---|---|
| 0000608 | 7/1978 | European Pat. Off. . |
| 0071070 | 7/1982 | European Pat. Off. . |
| 0071071 | 7/1982 | European Pat. Off. . |
| 0084809 | 1/1983 | European Pat. Off. . |
| 1062286 | 3/1967 | United Kingdom . |
| 1235660 | 6/1971 | United Kingdom . |
| 1240320 | 7/1971 | United Kingdom . |
| 1401253 | 7/1975 | United Kingdom . |
| 1455741 | 11/1976 | United Kingdom . |
| 1481209 | 7/1977 | United Kingdom . |
| 1504787 | 3/1978 | United Kingdom . |
| 1517789 | 7/1978 | United Kingdom . |
| 2029422 | 3/1980 | United Kingdom . |
| 1582602 | 1/1981 | United Kingdom . |

Primary Examiner—Thurman K. Page
Attorney, Agent, or Firm—Oblon, Fisher, Spivak, McClelland & Maier

[57] ABSTRACT

A coating composition comprising (A) 100 parts by weight of an acrylic copolymer and (B) from 0 to 40 parts by weight of a curing agent, wherein said acrylic copolymer is a copolymer of a monomer mixture composed essentially of:

(1) from 1 to 50% by weight of 1,4-butanediol mono(-meth)acrylate,
(2) from 0.2 to 10% by weight of an $\alpha,\beta$-monoethylenic unsaturated carboxylic acid, and
(3) from 40 to 98.8% by weight of other copolymerizable monomers, provided that the total of the 1,4-butanediol mono(-meth)acrylate and hydroxyl group-containing monomers in the copolymerizable monomers, is not more than 50% by weight of the monomer mixture.

14 Claims, 1 Drawing Sheet

COATING COMPOSITION AND METHOD FOR FORMING A MULTI-LAYERED COATING

This application is a continuation of application Ser. No. 833,250, filed on Feb. 27, 1986, now abandoned.

The present invention relates to a coating composition which is capable of providing a coating layer having excellent weather resistance and outer appearance and good non-sanding adhesion for e.g. automobiles, and a method for forming a multi-layered coating.

With respect to coating materials to be used for metals and plastics for e.g. automobiles, the requirements for weather resistance, outer appearance, chipping resistance, etc. tend to be severe year by year. In order to meet such requirements, a laminated coating including a primer coating layer, an intercoating layer and a top coating layer is formed on such a substrate. However, the properties required for the respective coating layers are different from one another, and the laminated coating comprises chemically and physically different coating layers, whereby the adhesion to one another is likely to be inadequate or coating layers tend to undergo a deterioration as time passes so that interlayer peeling is likely to result. Further, when a mend-coating is applied onto the top coating layer, the adhesion to the dried or cured top coating layer tends to be inadequate, which is likely to be a cause for troubles. Further with respect to the outer appearance, the requirements for new fasions tend to be severe in recent years, and many attempts have been made to improve the outer appearance by forming a multi-colored coating. However, inadequate adhesion between the coating layers is a serious problem. In order to improve the adhesion, it is common to apply sanding to a dried or cured coating layer, which requires substantial time and work, followed by coating, and a part of the desired properties is likely to be sacrificed. There is a strong demend for a coating composition which is capable of providing excellent non-sanding adhesion for the formation of a multi-layered coating.

It is an object of the present invention to overcome the above-mentioned conventional drawbacks and to provide a coating composition and a method for forming a multi-layered coating, whereby the coating process can be simplified by a non-sanding system which contributes to energy saving and cost-saving, and it is possible to form a coating having excellent durability and outer appearance.

The present invention provides a coating composition comprising (A) 100 parts by weight of an acrylic copolymer and (B) from 0 to 40 parts by weight of a curing agent, wherein said acrylic copolymer is a copolymer of a monomer mixture composed essentially of:
(1) from 1 to 50% by weight of 1,4-butanediol mono(meth)acrylate,
(2) from 0.2 to 10% by weight of an $\alpha,\beta$-monoethylenic unsaturated carboxylic acid, and
(3) from 40 to 98.8% by weight of other copolymerizable monomers,
provided that the total of the 1,4-butanediol mono(meth)acrylate and hydroxyl group-containing monomers in the copolymerizable monomers, is not more than 50% by weight of the monomer mixture.

Now, the present invention will be described in detail with reference to the preferred embodiments.

BRIEF DESCRIPTION OF THE DRAWINGS

In the accompanying drawings.

FIG. 1 illustrates a multi-layered coating in which a coating layer 2 made of the coating composition of the present invention is formed on the surface of a substrate 1, and a top coating layer 3 is formed thereon.

FIG. 2 illustrates a multi-layered coating similar to FIG. 1, but the substrate has a coating layer 4 on its surface.

FIGS. 3 and 4 illustrate multi-layered coatings formed by double coating such as mend-coating or thick coating. FIG. 3 illustrates an embodiment in which both a coating layer I (2) and a top coating layer (2) are made of the coating composition of the present invention. The top coating layer is formed on the baked coating layer I. FIG. 4 illustrates an embodiment wherein the top coating layer is composed of two layers (3 and 2), and the coating composition of the present invention is used for the top most layer 2.

FIGS. 5 and 6 illustrate two-tone color coatings. In FIG. 5, the coating layer I ($2c_1$) made of the coating composition of the present invention and a top coating layer $3c_2$ are colored with different colors.

FIG. 7 illustrates a three-tone color coating wherein a coating layer I ($2c_1$) made of the coating composition of the present invention, and a double-layered top coating comprising a coating layer $2'c_2$ made of the coating composition of the present invention and another coating layer $3c_3$, are colored with three different colors.

Figure 1:
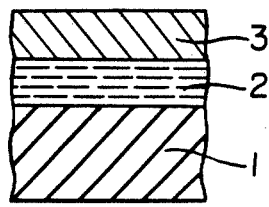
FIGS. 1 to 7 are cross-sectional views of multi-layered coatings obtained by the method of the present invention.
Figure 2:
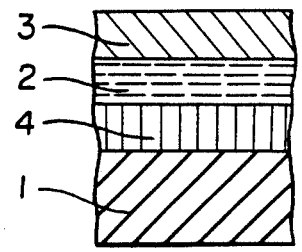

The 1,4-butanediol mono(meth)acrylate in the acrylic copolymer (A) used in the present invention, is 1,4-butanediol monoacrylate or 1,4-butanediol monomethacrylate, and is a component which contributes to the improvement of the adhesion to a substrate made of a metal or a resin having generally poor adhesion properties such as polyethylene or polypropylene and to a top coating layer which is formed on the coating layer made of the coating composition of the present invention, and which also contributes to the crosslinking reaction when the coating composition of the present invention contains a curing agent such as an amino resin or an isocyanate prepolymer. The 1,4-butanediol mono(meth)acrylate is used in an amount of from 1 to 50% by weight in the acrylic copolymer. If the amount is less than 1% by weight, the adhesion to the substrate and to the top coating layer will be inadequate. On the other hand, if the amount exceeds 50% by weight, the viscosity of the resin tends to be high, and the water resistance of the coating layer will be inferior. A preferred range is from 3 to 35% by weight.

The $\alpha,\beta$-monoethylenic unsaturated carboxylic acid used in the present invention serves to improve the affinity with pigments and the adhesion to the top coating layer, and also plays an important role as a catalyst for the crosslinking reaction in a case where the coating composition contains a curing agent. The $\alpha,\beta$-monoethylenic unsaturated carboxylic acid is a polymerizable monomer having at least one carboxyl group. As specific examples, there may be mentioned acrylic acid, methacrylic acid, itaconic acid, maleic acid, phthalic acid, fumaric acid and alcohol (such as methyl alcohol, ethyl alcohol or butyl alcohol) modified monoalkyl esters of itaconic acid, maleic acid, fumaric acid, etc. Such an $\alpha,\beta$-monoethylenic unsaturated carboxylic acid is used in an amount of from 0.2 to 10% by weight in the acrylic copolymer. If the amount is less than 0.2% by weight, the above-mentioned effects will be inadequate, and if the amount exceeds 10% by weight, the viscosity of the copolymer tends to be high and the water resistance will be inferior. A preferred range is from 0.5 to 5% by weight when an amino resin is used as a curing agent, and from 0.2 to 5% by weight when an isocyanate prepolymer is used as the curing agent.

As other copolymerizable monomers, there may be mentioned (meth)acrylates such as methyl(meth)acrylate, ethyl(meth)acrylate, n-propyl(meth)acrylate, n-butyl(meth)acrylate, isobutyl(meth)acrylate, tert-butyl(meth)acrylate, lauryl(meth)acrylate, cyclohexyl(meth)acrylate, benzyl(meth)acrylate, phenethyl(meth)acrylate and phenyl(meth)acrylate; styrene derivatives such as styrene, α-methylstyrene and vinyltoluene; polymerizable unsaturated nitriles such as acrylonitrile and methacrylonitrile; and vinyl esters such as vinyl acetate and vinyl propionate. These non-functional monomers may suitably selected for a combination with other functional monomers to provide the desired properties as a coating material for automobiles such as weather resistance, outer appearance, chemical resistance, water resistance and good physical properties. As other copolymerizable monomers other than those mentioned above, hydroxyalkyl(meth)acrylates such as 2-hydroxyethyl(meth)acrylates, 2-hydroxypropyl(meth)acrylate and 3-hydroxypropyl(meth)acrylate; esterification reaction products of monoepoxy compounds with (meth)acrylic acid, fumaric acid or maleic acid, such as "Carjera E" (glycidyl ester of a synthetic fatty acid, manufactured by Shell Chemical Company); hydroxyl group-containing monomers such as low molecular weight polyester resins having polymerizable unsaturated groups; N-alkoxy-substituted amides such as N-methoxymethyl(meth)acrylamide, N-ethoxymethyl(meth)acrylamide and N-butoxymethyl(meth)acrylamide; epoxy group-containing monomers such as glycidyl(meth)acrylate, (meth)acryl glycidyl ether or m-glycidyl(meth)acrylate; and basic monomers such as dimethylaminoethyl(meth)acrylate and diethylaminoethyl(meth)acrylate, may be employed as the case requires.

In the present invention, the total of the 1,4-butanediol mono(meth)acrylate and hydroxyl group-containing monomers among said other copolymerizable monomers, should be not more than 50% by weight. If the total exceeds 50% by weight, the viscosity of the resin tends to be high, and the water resistance of the coating layer will be inferior.

In the present invention, the monomer mixture constituting the acrylic copolymer (A) preferably comprises:

(1) from 1 to 50% by weight of 1,4-butanediol mono(meth)acrylate,
(2) from 0.2 to 10% by weight of an α,β-monoethylenic unsaturated carboxylic acid,
(3) from 15 to 98.8% by weight of an alkyl(meth)acrylate having an alkyl group of from 1 to 20 carbon atoms,
(4) from 0 to 40% by weight of styrene, and
(5) from 0 to 39% by weight of an alkyl hydroxy(meth)acrylate having an alkyl group of from 1 to 8 carbon atoms, provided that the total of the 1,4-butanediol mono(meth)acrylate and the alkyl hydroxy(meth)acrylate having an alkyl group of from 1 to 8 carbon atoms, is not more than 50% by weight.

The acrylic copolymer (A) in the present invention may be prepared by any conventinal method such as a solution polymerization method, a bulk polymerization method or an emulsion polymerization method. However, a polymer obtained by a solution polymerization method is preferred. In the solution polymerization method, the above-mentioned monomer mixture is copolymerized in the presence of an organic solvent and a polymerization initiator. The organic solvent may be a commonly employed organic solvent such as isopropyl alcohol, n-butanol, toluene or xylene. Likewise, the polymerization initiator may be a commonly employed polymerization initiator such as azobisisobutyronitrile, benzoyl peroxide or cumene hydroperoxide. If necessary, a chain transfer agent such as 2-mercaptoethanol or n-octyl mercaptan, may also be employed.

The coating composition of the present invention may further contain conventional components which are commonly employed for coating compositions, to an extent such that the desired properties of the present invention are not impaired. Namely, as such additional components, there may be mentioned resins other than acrylic resins, such as an alkyd resin, a polyester resin, an epoxy resin and a cellulose resin; various pigments; and various additives such as a surface controlling agent and an ultra-violet absorber. Further, for the coating operation, the coating composition of the present invention may be diluted to a proper level of viscosity suitable for coating, with an organic solvent suitable for the particular purpose, and then applied and dried or cured to form a coating layer.

The above-mentioned lacquer-type coating composition is particularly effective when the substrate is made of an olefin polymer such as polyethylene or polypropylene which has generally poor adhesion properties to a usual coating material.

Further, the coating composition of the present invention is capable of providing high levels of weather resistance, outer appearance, etc., when formulated into a thermosetting-type coating composition containing a curing agent such as an amino resin and an isocyanate prepolymer in an amount of not more than 40 parts by weight relative to 100 parts by weight of the acrylic copolymer (A), and used as a baking coating material for e.g. a metal substrate. In such a case, if the curing agent exceeds 40 parts by weight, the physical and chemical properties tend to deteriorate and at the same time the adhesion properties of the present invention will be impaired.

Specific examples of the amino resin include aminotriazine, urea, dicyandiamide and an alkyl etherification product of a methylol-modified N,N-ethylene urea with cyclohexanol or with an alkanol having from 1 to 6 carbon atoms. Particularly preferred is an amino resin obtained from aminotriazine, such as a methyl etherified melamine resin or a butyl etherified melamine resin. When an amino resin is used as the curing agent, an external catalyst such as a p-toluenesulfonic acid, dodecylbenzenesulfonic acid, naphthalenesulfonic acid or an amine-neutralized product thereof, may be added to the above coating composition.

When an isocyanate prepolymer is used as the curing agent, it is employed in an amount such that the molar ratio of X/Y is not higher than 1.5/1 where X is the molar amount of NCO groups in the isocyanate prepolymer and Y is the molar amount of OH groups in the acrylic copolymer (A), to obtain a room temperature curable or heat-curable coating composition, whereby it is possible to provide high levels of weather resistance, outer appearance, etc. The isocyanate prepolymer is a compound containing at least two free or blocked isocyanate groups per molecule. Specifically, there may be mentioned aliphatic isocyanates such as tetramethylene diisocyanate, hexamethylene diisocyanate and trimethylhexane diisocyanate; alicyclic diisocyanates such as isophorone diisocyanate and 4,4'-methylenebis(cyclohexyl isocyanate); aromatic diisocyanates such as xylylene diisocyanate and tolyene diisocyanate; adducts of isocyanate with a polyhydric alcohol such as ethylene glycol, propylene glycol, neopentyl glycol or trimethylol propane; adducts or buret products of a low molecular weight polyester resin or water having a functional group reactive with an isocyanate group; polymers of diisocyanates themselves, and blocked products obtained by blocking the isocyanate groups of these materials with a conventional blocking agent such as a low monohydric alcohol or methyl ethyl ketoxime. If the amount of the isocyanate prepolymer exceeds the molar ratio of $X/Y=1.5/1$, the physical and chemical properties tend to deteriorate, and at the same time, the adhesion properties of the present invention will also be impaired.

The above described coating composition is applied onto a substrate, and dried in the case of a lacquer containing no curing agent, or cured in the case where the composition contains the curing agent, to form a coating layer I. Then, without conducting sanding treatment, a top coating layer is formed directly on the entire surface, or a part thereof, of the coating layer I, whereby it is possible to form a multi-layered coating having various excellent properties (FIG. 1).

There is no particular restriction as to the substrate to be employed in the present invention, and the substrate may be made of a resin or a metal. Further, it is possible to employ a substrate having on its surface at least one coating layer (FIGS. 2 to 7).

Figure 3:
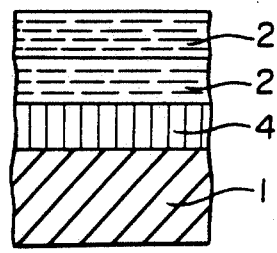
Figure 4:
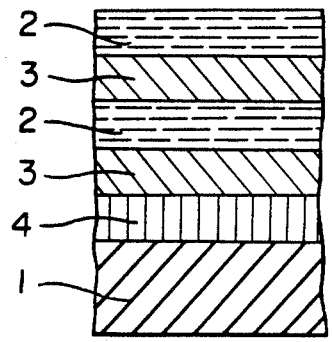

On the coating layer I, a top coating layer is formed. The top coating layer may be a single layer or a multi-layered coating comprising two or more layers. The coating composition of the present invention may be used also for the top coating layer (FIGS. 3 and 4). For instance, it is effective in that a double coating for mend-coating or thick coating can thereby be made by way of non-sanding coating.

Figures 5, 6, 7:
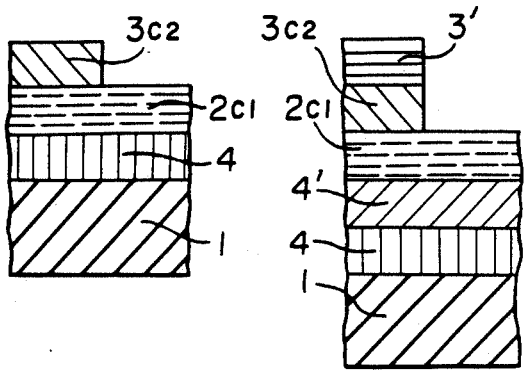

According to the present invention, a multi-colored multi-layered coating wherein two or more layers have different colors, such as a two-tone color coating, as shown in FIGS. 5 to 7, can be formed by non-sanding coating, whereby a coating having an extremely beautiful outer appearance can readily be obtained. For instance, the coating composition of the present invention is applied onto a substrate, followed by drying or curing to obtain a coating layer I, and then the coating layer I is partially masked by e.g. a masking tape. Then, the coating composition of the present invention having a different color is applied, followed by drying or curing, and the masking tape is then peeled off to obtain a multi-colored multi-layered coating such as a two-tone color coating.

Having thus provided the coating composition of the present invention and the method for forming a multi-layered coating as mentioned above, it has now been made possible to form a multi-layered coating which used to be difficult to form, by a non-sanding method. Thus, the present invention contributes to the nationalization and cost-saving to a large extent, and is substantially influential over the quality improvement of coating layers for various purposes.

Now, the present invention will be described in further detail with reference to Examples. However, it should be understood that the present invention is by no means restricted by these specific Examples. In the Examples, "parts" means "parts by weight".

EXAMPLES 1 to 5 and COMPARATIVE EXAMPLES 1 to 6

Onto a polypropylene plate with its surface cleaned with toluene, a thermoplastic coating composition as identified in Table 2 (P-1 to P-11) and containing an acrylic copolymer as identified in Table 1 (A-1 to A-11) as the main component, is applied by an air spray gun, and dried at 80° C. for 30 minutes to obtain a coating layer 1 having a thickness of 20 μm. Onto the coating layer 1, a heat-curable or thermoplastic coating composition (T-1 or T-2) containing an acrylic copolymer (D-1 or D-2) as the main component was applied (as identified in Table 3), and cured or dried at 80° C. for 30 minutes to form a coating layer 2 having a thickness of about 30 μm, whereby a multi-layered coating was obtained. The interlayer adhesion of the multi-layered coating was good both at the initial stage and after the weathering test in each Example, whereas in each Comparative Example, interlayer peeling was observed and, as such, the coating was practically useless.

In the present invention, the adhesion was evaluated by a peeling test wherein square sections of the coating layer defined by crosswise cutting lines (10×10 square sections of 1 mm²) were subjected to peeling test with a mending tape, whereby the number of square sections remaining unpeeled was counted).

EXAMPLES 6 and 7 and COMPARATIVE EXAMPLE 7

A cationic electrodeposition coating composition for automobilea was applied onto a steel plate treated with zinc phosphate, and then baked at 180° C. for 30 minutes. Then, a thermosetting intercoating composition as identified in Table 5 (N-1 or N-2) containing an acrylic copolymer as identified in Table 4 (B-1 or B-2) was applied thereon, and baked at 160° C. for 30 minutes to obtain a coating layer 1. Onto this coating layer, a coating layer 2 or coating layers 2 and 3 were formed by applying a top coating composition of 1-coat-1-bake or 2-coat-1-bake type as identified in Tables 4 to 6, followed by baking at 140° C. for 30 minutes, whereby a multi-layered coating was obtained. The adhesion of the coating layer 1 with the coating layer 2 or with the coating layers 2 and 3 was good in each of Example, whereas in the Comparative Example, peeling was observed.

EXAMPLES 8 and 9

A cationic electrodeposition coating composition for automobiles was applied onto a steel plate treated with zinc phosphate and then baked at 180° C. for 30 minutes. Then, an intercoating composition comprising an alkyd resin and an amino resin was further applied thereon and baked at 160° C. for 30 minutes. The coating layer thus obtained was subjected to water-sanding treatment and dried. Then, by using thermosetting coating compositions as identified in Tables 7 and 8, the main coating and the mend-coating as identified in Table 9 were applied by baking to obtain a multi-layered coating. The adhesion of the multi-layered coating thus obtained was excellent.

EXAMPLES 10 to 18

A cationic electrodeposition coating composition for automobiles was applied onto a steel plate treated with zinc phosphate, and baked at 180° C. for 30 minutes. Then, an intercoating composition comprising an alkyd resin and an amino resin was applied thereon and baked at 160° C. for 30 minutes. The coating layer thus obtained was subjected to water-sanding treatment, followed by drying. Then, a thermosetting top coating composition of 2-coat-1-bake type or 1-coat-1-bake type as identified in Tables 10 to 12 was applied and baked to form a coating layer of color 1.

The properties of each coating thus obtained are excellent as shown in Table 12 and suitable for top coating layers for automobiles.

Then, a half of the coating layer was masked, and a thermosetting top coating composition of 2-coat-1-bake type or 1-coat-1-bake type to form color 2 as identified in Table 13 was applied again and baked. Then, the masking tape was peeled off to obtain a two-tone color multi-layered coating of non-sanding type having excellent outer appearance.

The interlayer adhesion of each multi-layered coating thus obtained was good both at the initial stage and after the accelerated weather resistance test.

TABLE 1

| Coating layer | | 1 | | | | | | | | | | | 2 | |
|---|---|---|---|---|---|---|---|---|---|---|---|---|---|---|
| | Copolymer | A-1 | 2 | 3 | 4 | 5 | 6 | 7 | 8 | 9 | 10 | 11 | D-1 | 2 |
| Composition | Styrene | — | 30 | 10 | — | 20 | — | — | — | — | — | — | 10 | 10 |
| | Methyl methacrylate | 25 | — | 20 | 35 | 10 | 25 | 35 | 38 | 23 | 30 | 30 | 20 | 15 |
| | n-Butyl methacrylate | 35 | 19 | 9.5 | — | — | 25 | 35 | — | 20 | 25 | 10 | 45 | 49 |
| | n-Butyl acrylate | 28 | 40 | 25 | 40 | 23 | 28 | 28 | — | — | 30 | 30 | 10 | 20 |
| | 1,4-Butanediol monoacrylate | 10 | — | 35 | 10 | — | — | — | — | 35 | 15 | 15 | — | 13 |
| | 1,4-Butanediol monomethacrylate | — | 3 | — | — | 45 | — | — | 60 | — | — | — | — | — |
| | 2-Hydroxyethyl acrylate | — | — | — | 10 | — | 20 | — | — | 20 | — | — | 14 | — |
| | Methacrylic acid | 2 | 8 | — | — | — | 2 | 2 | 2 | 2 | — | 15 | 1 | 1 |
| | Acrylic acid | — | — | — | 5 | 2 | — | — | — | — | — | — | — | — |
| | Itaconic acid | — | — | 0.5 | — | — | — | — | — | — | — | — | — | — |
| | Toluene | 80 | 80 | 80 | 80 | 80 | 80 | 80 | 80 | 80 | 80 | 80 | 50 | 50 |
| | Xylene | 20 | 20 | 20 | 20 | 20 | 20 | 20 | 20 | 20 | 20 | 20 | 40 | 40 |
| | Solvesso #100 | — | — | — | — | — | — | — | — | — | — | — | 10 | 10 |
| Properties of the solution | Viscosity *1 | X | Y | Z | Z | Z | Y | V | $Z_5$ | $Z_6$ | X | $Z_4$ | $Z_1$ | Y |
| | Residue upon heating (%) | 45 | 45 | 45 | 45 | 45 | 45 | 45 | 45 | 45 | 45 | 45 | 50 | 50 |
| | Acid value | 5.5 | 22.1 | 1.4 | 14.2 | 5.6 | 5.5 | 5.5 | 5.5 | 5.5 | 0.1 | 41.0 | 3.0 | 3.0 |

*1 Viscosity: Gardner viscosity at 25° C.

TABLE 2

| Coating layer | | | 1 | | | | | | | | | | 2 | |
|---|---|---|---|---|---|---|---|---|---|---|---|---|---|---|
| Coating composition | | P 1 | 2 | 3 | 4 | 5 | 6 | 7 | 8 | 9 | 10 | 11 | T 1 | 2 |
| Copolymer | A-1 | 100 | — | — | — | — | — | — | — | — | — | — | — | — |
| | 2 | — | 100 | — | — | — | — | — | — | — | — | — | — | — |
| | 3 | — | — | 100 | — | — | — | — | — | — | — | — | — | — |
| | 4 | — | — | — | 100 | — | — | — | — | — | — | — | — | — |
| | 5 | — | — | — | — | 100 | — | — | — | — | — | — | — | — |
| | 6 | — | — | — | — | — | 100 | — | — | — | — | — | — | — |
| | 7 | — | — | — | — | — | — | 100 | — | — | — | — | — | — |
| | 8 | — | — | — | — | — | — | — | 100 | — | — | — | — | — |
| | 9 | — | — | — | — | — | — | — | — | 100 | — | — | — | — |
| | 10 | — | — | — | — | — | — | — | — | — | 100 | — | — | — |
| | 11 | — | — | — | — | — | — | — | — | — | — | 100 | — | — |
| | D-1 | — | — | — | — | — | — | — | — | — | — | — | 100 | — |
| | 2 | — | — | — | — | — | — | — | — | — | — | — | — | 100 |
| Hardlen 14-LLB *1 | | 10 | 10 | 10 | 10 | 10 | 10 | 10 | 10 | 10 | 10 | 10 | — | — |
| Sumidur N-75 75 *2 | | — | — | — | — | — | — | — | — | — | — | — | 14 | — |
| Modaflow *3 | | — | — | — | — | — | — | — | — | — | — | — | 1 | 1 |
| Titanium oxide CR-90 *4 | | 24 | 24 | 24 | 24 | 24 | 24 | 24 | 24 | 24 | 24 | 24 | 60.5 | 50 |
| Thinner | Toluene | 100 | 100 | 100 | 100 | 100 | 100 | 100 | 100 | 100 | 100 | 100 | 50 | 50 |
| | Xylene | — | — | — | — | — | — | — | — | — | — | — | 50 | 50 |
| Diluted | | 15 | 15 | 15 | 15 | 15 | 15 | 15 | 15 | 15 | 15 | 15 | 15 | 15 |

TABLE 2-continued

| Coating layer | 1 | | | | | | | | | | | 2 | |
|---|---|---|---|---|---|---|---|---|---|---|---|---|---|
| Coating composition | P 1 | 2 | 3 | 4 | 5 | 6 | 7 | 8 | 9 | 10 | 11 | T 1 | 2 |
| viscosity *5 | | | | | | | | | | | | | |

*1 Propylene chloride (chlorine content: 2.7%, Toyo Kasei Kogyo K.K.)
*2 Isocyanate resin (NCO content: 16.5%, Sumitomo-Bayer Urethane K.K.)
*3 Surface controlling agent (xylene solution containing 10% by weight of acrylic polymer, Monsanto Company)
*4 Titanium dioxide (Ishihara Sangyo Kaisha Ltd.)
*5 Diluted viscosity: Measured by Ford cup #4 (unit: sec)

TABLE 3

| | | Examples | | | | | Comparative Examples | | | | | |
|---|---|---|---|---|---|---|---|---|---|---|---|---|
| | | 1 | 2 | 3 | 4 | 5 | 1 | 2 | 3 | 4 | 5 | 6 |
| Coating layer 1 | Coating composition | P-1 | 2 | 3 | 4 | 5 | 1 | 2 | 3 | 4 | 5 | 6 |
| Coating layer 2 | Coating composition | T-1 | 2 | 1 | 1 | 1 | 1 | 1 | 1 | 1 | 1 | 1 |
| Adhesion | Propylene and coating layer 1 | 100/100 | 100/100 | 100/100 | 100/100 | 90/100 | 60/100 | 100/100 | 20/100 | 20/100 | 100/100 | 20/100 |
| | Coating layer 1 and coating layer 2 | 100/100 | 100/100 | 100/100 | 100/100 | 100/100 | 50/100 | 0/100 | 100/100 | 100/100 | 40/100 | 100/100 |
| Outer appearance Pencil hardness *1 | | H | H | H | H | H | H | H | H | H | H | H |
| Gasoline resistance *2 | | | | | | | | Δ | | | | |
| Acid resistance *3 | | | | | | | | | Δ | Δ | | |
| Hot water resistance *4 | | | | | | | | Δ | Δ | Δ | | |
| Weather resistance *5 | Outer appearance | | | | | | | | | | | |
| | Adhesion | 100/100 | 100/100 | 100/100 | 100/100 | 80/100 | 0/100 | 0/100 | 0/100 | 0/100 | 0/100 | 0/100 |

*1 Mitsubishi Uni, manufactured by Mitsubishi Pencil Co., Ltd.
*2 The test sample was dipped in Nisseki Gold Gasoline at 20° C. for 24 hours and then the outer appearance was evaluated.
*3 A 10% $H_2SO_4$ aqueous solution was dropped on the test sample, then left at 20° C. for 24 hours, and washed with water and the outer appearance was then evaluated.
*4 The test sample was dipped in hot water at 50° C. for 3 days and then the outer appearance was evaluated.
*5 Evaluated after exposure for 1000 hrs by sunshine weatherometer (manufactured by Suga Shikenki K.K.)

TABLE 4

| Coating layer | | 1 | | 2 | | 3 |
|---|---|---|---|---|---|---|
| Copolymer | | B-1 | B-2 | D-3 | D-4 | D-5 |
| Composition | Styrene | 35 | 35 | — | 10 | 30 |
| | Methyl methacrylate | — | — | — | 30 | — |
| | n-Butyl methacrylate | — | — | — | — | 40 |
| | Ethyl acrylate | 47 | 47 | — | 46 | — |
| | n-Butyl acrylate | — | — | — | — | 12 |
| | 1,4-Butanediol monoacrylate | 15 | — | — | — | — |
| | 2-Hydroxyethyl methacrylate | — | 15 | — | 12 | 15 |
| | Methacrylic acid | 3 | 3 | — | 2 | 3 |
| | Isophthalic acid | — | — | 44 | — | — |
| | Adipic acid | — | — | 10 | — | — |
| | Trimethylol propane | — | — | 10 | — | — |
| | Neopentyl glycol | — | — | 18 | — | — |
| | 1,6-Hexanediol | — | — | 18 | — | — |
| | n-Butanol | 20 | 20 | — | 10 | 20 |
| | Xylene | 20 | 20 | 34.4 | 45 | — |
| | Toluene | — | — | — | 45 | — |
| | Solvesso #100 | 60 | 60 | — | — | 80 |
| | Cellosolve acetate | — | — | 8.6 | — | — |
| Properties of the solution | Viscosity *1 | $Z_2$ | $Z_2$ | U | Z | V |
| | Residue upon heating (%) | 60 | 60 | 70 | 50 | 60 |
| | Acid value | 11.5 | 12.0 | 8.0 | 6.5 | 12.0 |

*1 Viscosity: Gardner viscosity at 25° C.

TABLE 5

| Coating layer | | 1 | | 2 | | 3 |
|---|---|---|---|---|---|---|
| Coating composition | | N-1 | N-2 | T-3 | T-4 | T-5 |
| Copolymer | B-1 | 100 | — | — | — | — |
| | B-2 | — | 100 | — | — | — |
| | D-3 | — | — | 100 | — | — |
| | D-4 | — | — | — | 100 | — |
| | D-5 | — | — | — | — | 100 |
| Uban 20 SE *1 | | 33.3 | 3.33 | 50 | 20.8 | 42.9 |
| Modaflow | | — | — | 0.7 | — | 0.6 |
| Titanium oxide(CR-90) | | 34.3 | 34.3 | 100 | — | — |
| Al paste 1700 NL *2 | | — | — | — | 12.5 | — |
| Thinner | Toluene | — | — | — | 40 | — |
| | Xylene | 40 | 40 | 20 | — | 20 |
| | Solvesso #100 | 60 | 60 | 60 | — | 60 |
| | Solvesso #150 | — | — | 20 | 20 | 20 |
| | Ethyl acetate | — | — | — | 40 | — |
| Diluted viscosity *3 | | 18 | 18 | 20 | 13 | 30 |

*1 Uban 20 SE: Butylated melamine resin, manufactured by Mitsui Toatsu Chemicals Co., Ltd.
*2 Al paste 1700 NL: Aluminum paste, manufactured by Toyo Aluminum Co., Ltd.
*3 Measured by Ford cup #4 (unit: sec)

TABLE 6

| | | Example 6 | Example 7 | Comparative Example 7 |
|---|---|---|---|---|
| Coating | Coating | N-1 | N-1 | N-2 |

TABLE 6-continued

|  | Example 6 | Example 7 | Comparative Example 7 |
|---|---|---|---|
| layer 1 composition |  |  |  |
| Coating ↑ layer 2 | T-3 | T-4 | T-3 |
| Coating ↑ layer 3 | — | T-5 | — |
| Adhesion of coating layer 1 and 2* | 100/100 | 100/100 | 100/100 |
| Outer appearance |  |  |  |
| Pencil hardness | F-H | F-H | F-H |
| Gasoline resistance |  |  |  |
| Acid resistance |  |  |  |
| Hot water resistance |  |  | −Δ |
| Weather Outer resistance appearance |  |  |  |
| Adhesion | 100/100 | 100/100/ | 0/100 |

Baking conditions: N-1 or N-2 applied onto a substrate → baking at 160° C. for 30 minutes → → T-3 was applied by coating or T-4/T-5 was applied by wet-on-wet coating → baking at 140° C. for 30 minutes.

TABLE 7

|  |  | D-6 | D-7 | D-8 |
|---|---|---|---|---|
| Composition | Styrene | 5 | — | 35 |
|  | Methyl methacrylate | — | 50 | — |
|  | Isobutyl methacrylate | 45 | — | 30 |
|  | Ethyl acrylate | — | 33 | — |
|  | 2-Ethylhexyl acrylate | 29 | — | 15 |
|  | 1,4-Butanediol monoacrylate | 20 | — | 18 |
|  | 2-Hydroxyethyl methacrylate | — | 15 | — |
|  | Methacrylic acid | 1 | 2 | 2 |
|  | Toluene | 50 | — | — |
|  | Xylene | 50 | 80 | — |
|  | n-Butanol | — | 20 | 20 |
|  | Solvesso #100 | — | — | 80 |
| Properties of the solution | Viscosity *1 | X | Z$_2$ | U |
|  | Residue upon heating (%) | 60 | 50 | 60 |
|  | Acid value | 3.0 | 6.3 | 7.0 |

*1 Viscosity: Gardner viscosity at 25° C.

TABLE 8

| Coating composition |  | T-6 | T-7 | T-8 |
|---|---|---|---|---|
| Copolymer | D-6 | 100 | — | — |
|  | D-7 | — | 100 | — |
|  | D-8 | — | — | 100 |
| Sumidur N-75 |  | 25 | — | — |
| Uban 20 SE |  | — | 27.8 | 43 |
| Modaflow |  | 0.6 | — | 0.6 |
| Titanium dioxide (CR-90) |  | 80 | — | — |
| Al paste 1700 NL |  | — | 13.3 | — |
| Thinner | Toluene | 50 | 40 | — |
|  | Xylene | 50 | — | 20 |
|  | Solvesso #100 | — | — | 60 |
|  | Solvesso #150 | — | 20 | 20 |
|  | Ethyl acetate | — | 40 | — |
| Diluted viscosity *1 |  | 13 | 13 | 30 |

*1 Measured by Ford cup #4 (unit: sec)

TABLE 9

|  |  |  | Example 8 | Example 9 | Remarks |
|---|---|---|---|---|---|
| Main coating | Coating layer 1 | Coating composition | T-6 | T-7 | Coating layers 1 and 2 were applied by a wet-on-wet coating |
|  | Coating layer 2 | Coating composition | — | T-8 |  |
|  | Baking condition (°C. for 30 minutes) |  | 100 | 140 |  |
| Mend-coating | Coating layer 3 | Coating composition | T-6 | T-7 | Coating layers 3 and 4 were applied by a wet-on-wet coating |
|  | Coating layer 4 | Coating composition | — | T-8 |  |
|  | Baking condition (°C. for 30 minutes) |  | 80 | 110 |  |
| The adhesion between the main coating and the mend-coating |  |  | 100/100 | 100/100 | — |

TABLE 10

| Copolymer |  | D-10 | 11 | 12 | 13 |
|---|---|---|---|---|---|
| Composition | Styrene | 20 | 10 | — | 50 |
|  | Methyl methacrylate | — | 10 | 45 | 10 |
|  | n-Butyl methacrylate | 37 | 40 | — | — |
|  | n-Butyl acrylate | 15 | 16 | — | 18 |
|  | Ethyl acrylate | — | — | 39.5 | — |
|  | 1,4-Butanediol monoacrylate | 25 | 15 | — | 20 |
|  | 2-Hydroxyethyl acrylate | — | 10 | 14 | — |
|  | Methacrylic acid | 3 | 1 | 1.5 | 2 |
|  | n-Butanol | 20 | — | — | 20 |
|  | Solvesso #100 | 80 | — | — | 80 |
|  | Xylene | — | 80 | 45 | — |
|  | n-Butyl acetate | — | 20 | — | — |
|  | Methyl isobutyl ketone | — | — | 10 | — |
|  | Toluene | — | — | 45 | — |
| Properties of the solution | Viscosity *1 | V | X | Y | W |
|  | Residue upon heating (%) | 60 | 60 | 50 | 60 |
|  | Acid value | 12.0 | 3.5 | 5.0 | 7.8 |

*1 Viscosity: Gardner viscosity at 25° C.

TABLE 11

|  |  | Coating layer |  |  |  |  |  |
|---|---|---|---|---|---|---|---|
|  |  | 2-coat-1-bake type clear |  | 2-coat-1-bake type base |  | 1-coat-1-bake solid color |  |
|  |  | Curing agent |  |  |  |  |  |
|  |  | Amino resin | Isocyanate | Amino resin | Isocyanante | Amino resin | Isocyanate |
| Coating composition |  | T-10 | T-11 | T-12 | T-13 | T-14 | T-15 | T-16 | T-17 |
| Copolymer | D-10 | 100 | — | — | — | — | 100 | — |
|  | D-11 | — | 100 | — | — | — | — | 100 |
|  | D-12 | — | — | 100 | 100 | 100 | — | — |

TABLE 11-continued

|  |  | Coating layer | | | | | | |
|---|---|---|---|---|---|---|---|---|
|  |  | 2-coat-1-bake type clear | | 2-coat-1-bake type base | | | 1-coat-1-bake solid color | | |
|  |  | Curing agent | | | | | | |
|  |  | Amino resin | Isocyanate | Amino resin | | Isocyanante | Amino resin | | Isocyanate |
| Coating composition | | T-10 | T-11 | T-12 | T-13 | T-14 | T-15 | T-16 | T-17 |
| D-13 | | — | — | — | — | — | — | 100 | — |
| Uban 20 SE | | 40 | — | — | — | — | 30 | 30 | — |
| Sumidur N-75 | | — | 25 | 20 | 20 | 15 | — | — | 20 |
| Modaflow | | 0.6 | 0.6 | — | — | — | — | — | — |
| Al paste 1700 NL | | — | — | 15 | 10 | — | — | — | — |
| Collofine blue #720 *1 | | — | — | — | 5 | — | — | — | — |
| Titanium oxide CR-90 | | — | — | — | — | — | 60 | 60 | 60 |
| Thinner | Toluene | — | 20 | 40 | 40 | 50 | — | — | 20 |
|  | Xylene | 20 | 80 | — | — | — | 20 | 20 | 80 |
|  | Solvesso #100 | 40 | — | — | — | — | 80 | 80 | — |
|  | Solvesso #150 | 20 | — | 20 | 20 | 10 | — | — | — |
|  | Ethyl acetate | — | — | 40 | 40 | 40 | — | — | — |
| Diluted viscosity | | 30 | 20 | 13 | 13 | 13 | 20 | 20 | 20 |

*1 Collofine #720: Pigment chips (blue), manufactured by Dainippon Ink & Chemicals Ink.
*2 Diluted viscosity: Measured by Ford cup #4 (unit: sec)

TABLE 12

| Coating layer of color 1 | 2-coat-1-bake metallic type | | 1-coat-1-bake solid color type | | |
|---|---|---|---|---|---|
| Curing agent | Amino resin | Isocyanate | Amino resin | | Isocyanante |
| 2-coat-1-bake metallic base | T-12 | T-14 | — | — | — |
| 2-coat-1-bake clear coat | T-10 | T-11 | — | — | — |
| 1-coat-1-bake solid color | — | — | T-15 | T-16 | T-17 |
| Outer appearence | | | | | |
| Pencil hardness *1 | F | H | H | H | H |
| Gasoline resistance *2 | | | | | |
| Acid resistance *3 | | | | | |
| Hot water resistance *4 | | | | | |
| 2-coat-1-bake metallic base | T-12 | T-14 | — | — | — |
| 2-coat-1-bake clear coat | T-10 | T-11 | — | — | — |
| 1-coat-1-bake solid color | — | — | T-15 | T-16 | T-17 |
| Baking temperature (°C. for 30 minutes) | 140 | 100 | 140 | 140 | 100 |

*1 Mitsubishi Uni
*2 The test sample was dipped in Nisseki Gold Gasoline at 20° C. for 24 hours
*3 A 10% $H_2SO_4$ aqueous solution was dropped on the test sample, then left at 20° C. for 24 hours.
*4 The test sample was dipped in hot water at 50° C. for 10 days and then the outer appearence was evaluated

TABLE 13

|  | Formation of a multi-layered coating | | Baking temperature (°C. for 30 min.) | | Two-tone color | Accelerated weather resistance *1 | |
|---|---|---|---|---|---|---|---|
|  | Color 1 | Color 2 | Color 1 | Color 2 | Adhesion | outer appearance | Adhesion |
| Example 10 | T-12/T-10 | T-10/T-13 | 140 | 110 | 100/100 |  | 100/100 |
| Example 11 | T-12/T-10 | T-11/T-14 | 140 | 80 | 100/100 |  | 100/100 |
| Example 12 | T-12/T-10 | T-15 | 140 | 110 | 100/100 |  | 100/100 |
| Example 13 | T-12/T-10 | T-3 *2 | 140 | 110 | 100/100 |  | 100/100 |
| Example 14 | T-12/T-10 | T-17 | 140 | 80 | 100/100 |  | 100/100 |
| Example 15 | T-14/T-11 | T-15 | 100 | 110 | 100/100 |  | 100/100 |
| Example 16 | T-15 | T-10/T-13 | 140 | 110 | 100/100 |  | 100/100 |
| Example 17 | T-16 | T-10/T-13 | 140 | 110 | 100/100 |  | 100/100 |

TABLE 13-continued

| | Formation of a multi-layered coating | | Baking temperature (°C. for 30 min.) | | Two-tone color Adhesion | Accelerated weather resistance *1 | |
| --- | --- | --- | --- | --- | --- | --- | --- |
| | Color 1 | Color 2 | Color 1 | Color 2 | | outer appearance | Adhesion |
| Example 18 | T-17 | T-11/T-14 | 100 | 80 | 100/100 | | 100/100 |

*1 Evaluated after exposure for 1000 hrs by sunshine weatherometer
*2 The properties of coating T-3 are indicated in Table 6.

We claim:

1. A method for forming a multi-layered coating comprising at least two layers, which comprises:
    applying a coating composition onto a substrate, followed by drying to form a coating layer I, then forming a top coating layer on the entire surface, or over a part of the coating layer I, without sanding of the applied coating composition, said coating composition comprising an acrylic copolymer prepared from a monomer mixture consisting essentially of:
    (1) from 1 to 50% by weight of 1,4-butanediol mono(meth)acrylate,
    (2) from 0.2 to 10% by weight of an $\alpha,\beta$-monoethylenically unsaturated carboxylic acid, and
    (3) from 40 to 98.8% by weight of other copolymerizable monomers selected from the group consisting of (meth)acrylates, styrene derivatives, polymerizable unsaturated nitriles, vinyl esters, hydroxyalkyl(meth)acrylates, esterification reaction products of monoepoxy compounds with (meth)acrylic acid, fumaric acid or maleic acid, hydroxyl group-containing monomers, N-alkoxy-substituted amides, epoxy group-containing monomers, and basic monomers,
    provided that the total of the 1,4-butanediol mono(meth)acrylate and hydroxyl group-containing monomers in the copolymerizable monomers, is not more than 50% by weight of the monomer mixture.

2. The method of forming a multi-layered coating according to claim 1, wherein the substrate has on its surface at least one coating layer.

3. The method for forming a multi-layered coating according to claim 1, wherein the top coating layer comprises at least two layers.

4. The method for forming a multi-layered coating according to claim 2, wherein the top coating layer comprises at least two layers.

5. The method for forming a multi-layered coating according to claim 1, wherein the coating layer I and the top coating layer are colored with different colors.

6. A method for forming a multi-layered coating comprising at least two layers, which comprises: applying a coating composition onto a substrate, followed by curing to form a coating layer I, then forming a top coating layer on the entire surface, or over a part of the coating layer I, without sanding of the applied coating composition, said coating composition comprising (A) 100 parts by weight of an acrylic copolymer and (B) from 3 to 40 parts by weight of a curing agent, wherein said acrylic copolymer is a copolymer of a monomer mixture consisting essentially of:
    (1) from 1 to 50% by weight of 1,4-butanediol mono(meth)acrylate,
    (2) from 0.2 to 10% by weight of an $\alpha,\beta$-monoethylenically unsaturated carboxylic acid, and
    (3) from 40 to 98.8% by weight of other copolymerizable monomers selected from the group consisting of (meth)acrylates, styrene derivatives, polymerizable unsaturated nitriles, vinyl esters, hydroxyalkyl(meth)acrylates, esterification reaction products of monoepoxy compounds with (meth)acrylic acid, fumaric acid or maleic acid, hydroxyl group-containing monomers, N-alkoxy-substituted amides, epoxy group-containing monomers, and basic monomers,
    provided that the total of the 1,4-butanediol mono(meth)acrylate and hydroxyl group-containing monomers in the copolymerizable monomers is not more than 50% by weight of the monomer mixture.

7. The method for forming a multi-layered coating according to claim 6, wherein the curing agent is an amino resin.

8. The method for forming a multi-layered coating according to claim 7, wherein the amino resin is present in an amount of from 10 to 40 parts by weight relative to 100 parts by weight of the acrylic copolymer.

9. The method for forming a multi-layered coating according to claim 6, wherein the curing agent is an isocyanate prepolymer, and the molar ratio of X/Y is not higher than 1.5/1 where X is the molar amount of NCO groups in the isocyanate prepolymer and Y is the molar amount of OH groups in the acrylic copolymer (A).

10. The method for forming a multi-layered coating according to claim 9, wherein the molar ratio of X/Y ranges from 0.5/1 to 1.5/1.

11. The method for forming a multi-layered coating according to claim 6, wherein the substrate has on its surface at least one coating layer.

12. The method of forming a multi-layered coating according to claim 6, wherein the top coating layer comprises at least two years.

13. The method for forming a multi-layered coating according to claim 11, wherein the top coating layer comprises at least two layers.

14. The method for forming a multi-layered coating according to claim 6, wherein the coating layer I and the top coating layer are colored with different colors.

* * * * *